US005701357A

United States Patent [19]

Matsuo et al.

[11] Patent Number: 5,701,357
[45] Date of Patent: Dec. 23, 1997

[54] LOUDSPEAKER STRUCTURE WITH A DIFFUSER

[75] Inventors: Shinta Matsuo, Kokubunji; Yoshio Sakamoto, Hachioji, both of Japan

[73] Assignee: Kabushiki Kaisha Kenwood, Tokyo, Japan

[21] Appl. No.: 713,350

[22] Filed: Sep. 13, 1996

Related U.S. Application Data

[62] Division of Ser. No. 517,352, Aug. 21, 1995, which is a continuation of Ser. No. 223,968, Apr. 6, 1994, abandoned.

[30] Foreign Application Priority Data

Apr. 9, 1993 [JP] Japan .................................... 5-107367

[51] Int. Cl.[6] ...................................................... H04B 25/00
[52] U.S. Cl. ........................................... 381/199; 381/192
[58] Field of Search .................................... 381/199, 192, 381/193, 194, 205, 186; 29/594

[56] References Cited

U.S. PATENT DOCUMENTS

| | | | |
|---|---|---|---|
| 3,201,529 | 8/1965 | Surh | 381/193 |
| 3,898,393 | 8/1975 | Digre | 381/197 |
| 4,256,930 | 3/1981 | Garner et al. | 381/156 |
| 4,965,839 | 10/1990 | Elieli | 381/195 |
| 5,594,805 | 1/1997 | Sakamoto et al. | 381/199 |

FOREIGN PATENT DOCUMENTS

| | | |
|---|---|---|
| 3-936639 | 3/1991 | Germany . |
| 4-021651 | 6/1991 | Germany . |
| 2-155733 | 9/1985 | United Kingdom . |

*Primary Examiner*—Sinh Tran
*Attorney, Agent, or Firm*—Sixbey, Friedman, Leedom & Ferguson, P.C.; Gerald J. Ferguson, Jr.; Karlton C. Butts

[57] ABSTRACT

A loudspeaker capable or reliably realizing a repulsion magnetic circuit without using adhesive agent, improving the reliability of the loudspeaker, and facilitating the adjustment of sound quality and anti-heat, and a method of assembling a loudspeaker easily and safely. A structure of a loudspeaker including a repulsion magnetic circuit formed by two magnets with the same polarity being faced with each other and by a plate made of magnetic material such as iron and interposed between the two magnets, and a voice coil disposed in a magnetic field at the outer circumferential area of the plate, wherein a support shaft is formed on a holder for holding magnetic circuit components, the magnets and plate are disposed on the support shaft with position alignment, the support shaft is formed with a mount for a fastening member such as a thread, a guide hole, a projection, and a recess, and the magnets and plate are fastened and fixed by coupling the fastening member to the mount.

5 Claims, 6 Drawing Sheets

LOUDSPEAKER STRUCTURE WITH A DIFFUSER

This is a Divisional application of Ser. No. 08/517,352, filed Aug. 21, 1995; which itself is a continuation of Ser. No. 08/223,968, filed Apr. 6, 1994, now abandoned.

BACKGROUND OF THE INVENTION

1. Field of the Invention

The present invention relates to a loudspeaker structure and a method of assembling a loudspeaker, for a loudspeaker of the type that a magnetic circuit generating a repulsion magnetic field (hereinafter called "repulsion magnetic circuit") is generated by two magnets with the same polarity being faced with each other, a magnetic material plate is interposed therebetween, and a voice coil is placed in the magnetic field at the outer peripheral area of the plate.

2. Related Background Art

Various types of loudspeakers using a repulsion magnetic circuit have bee proposed, for example, in Japanese Patent Laid-open Publication No. 56-34298, Japanese Utility Model Laid-open Publication No. 59-48197, Japanese Patent Laid-open Publication No. 60-3270, Japanese Utility Model Laid-open Publication No. 61-128896, and Japanese Patent Laid-open Publication No. 1-98400. The present inventors have proposed loudspeakers of this type having an improved performance.

In conventional methods of assembling a repulsion magnetic circuit, magnets 2 and a plate 2 are bonded and fixed together as shown in FIG. 5A, or magnets 1 and a plate 2 mounted on a holder 4 are fastened and fixed by a screw 12 as shown in FIG. 8B. In the case of a conventional loudspeaker proposed by the prevent inventors, a support shaft 4*a* is formed integrally with a holder 4 and holes of magnetic circuit components are fitted around the support shaft to fix them by using a screw or to bend and fix them, as shown in FIG. 8C.

In a repulsion magnetic circuit, two magnets with the same polarity being faced with each other are used. Therefore, during assembling them, the to repulsing magnets may jump out of a magnetic circuit holding unit. In order to avoid this, it is necessary to use strong adhesive agents and bend the components together. However, this bending strength is not so much reliable in practical use.

In the case of the method illustrated in FIG. 8A, the lower magnet, plate, and upper magnet are bonded together in this order and disposed on the upper surface of the holder 4. However, each component has no structure for helping align its center. It is therefore difficult to assemble them.

In the screw fastening method illustrated in FIG. 8B, the length of the screw 12 is required to be a length corresponding to the total thickness of the two magnets 1 and plate 2 plus the length of an internal thread 4*d*. Using this long screw makes it difficult to align each magnetic circuit component at a high precision, and also poses some problem of the performance of a magnetic circuit itself. Furthermore, if strong magnets 1 or a thin plate 2 are used, a stronger repulsion force is generated. It becomes therefore difficult to assemble them by using a screw having a limited length.

In the screw fastening method illustrated in FIG. 8B, after inserting the screw 12 into the magnets 1 and plate 2, the head portion of the screw 12 is engaged with the internal thread 4*d* formed in the holder 4. Since the screw 12 is inserted into the magnetic circuit components, a worker cannot visually confirm the head portion of the screw 12 and the internal thread 4*d*, resulting in a low working efficiency. This structure is very disadvantageous particularly for an assembly process required to complete a work in several seconds.

Furthermore, center holes formed in the plate 2 and magnets 1 have some play relative to the screw 12. It is therefore very difficult to align the centers of the magnets 1 and plate 1. A poor center alignment generates an uneven distribution of magnetic fluxes supplied to a voice coil, causing a degraded sound quality.

In the magnetic circuit assembly methods illustrated in FIGS. 8B and 8C, the support shaft 4*a* or screw 12 is inserted into the magnet, plate, and magnet, in this order. The length of the support shaft 4*a* or screw 12 is limited and set to the length necessary only for fastening the magnetic circuit components. This length is short from the viewpoint of an assembly work. When the support shaft 4*a* or screw 12 is inserted first into the magnet and next into the plate 2 and when the plate 2 comes near the first magnet, it is attracted by the magnet and tightly contacts the magnet. This working condition is very bad. Furthermore, a danger in an assembly work may occur if fingers holding the plate are squeezed between the magnet and plate when the magnet attracts the plate.

SUMMARY OF THE INVENTION

It is an object of the present invention to solve the above problems associated with conventional loudspeakers and provide a loudspeaker capable of reliably realizing a repulsion magnetic circuit without using adhesive agent, improving the reliability of the loudspeaker, and facilitating the adjustment of sound quality and heat dissipation, and a method of assembling a loudspeaker easily and safely.

According to the structure of a loudspeaker using a repulsion magnetic circuit and a loudspeaker assembly method of this invention, a support shaft is formed on a holder for holding magnetic circuit components, the magnets and plate are disposed on the support shaft with position alignment, the support shaft is formed with a mount for a fastening member such as a thread, a guide hole, a projection, and a recess, and the magnets and plate are fastened and fixed by coupling the fastening member to the mount. As the fastening member, various types of diffusers can be used depending upon use purposes.

If the inner diameters of magnets and a plate are small as in the case of a magnetic circuit used for a voice coil having a small diameter, a support shaft is formed on a screw or a diffuser and mounted on the holder.

In an assembly process, a pole type magnetic circuit insertion jig having the same diameter as the support shaft is inserted into a space defined by the mount for the fastening member such as a thread, a guide hole, a projection, and a recess.

In mounting a diffuser, an outer thread of the diffuser is engaged with an inner thread formed on the support shaft. Diffusers made of different materials and having different shapes are prepared for replacement thereof. If a chamber is mounted, the magnetic circuit components are fixed by using a nut threaded into an outer thread formed on the head of the support shaft.

A support shaft maybe formed depending from the bottom of a diffuser or a screw to engage it with an inner thread formed in the bottom of the holder.

By mounting a diffuser in the above-described manner, the repulsion magnetic circuit can be easily and securely fixed. By changing the material and shape of a diffuser or by interposing a heat dissipating spacer between a diffuser and magnetic circuit components, it is possible to adjust the characteristics and sound quality of a loudspeaker or adjust heat dissipation.

A chamber can be mounted by using a screw having a wide and thin flange in place of a diffuser.

If the inner diameters of the magnetic circuit components are so small that a thread and a guide hole cannot be formed in the support shaft, a support shaft is formed depending from the bottom of a diffuser or a screw.

In assembling a loudspeaker, the magnetic circuit insertion jig is used. By inserting the magnets and plate one after another separately into the holder, it is possible to weaken the influence of an attraction force or repulsion force between these components, realizing a simple assembly work.

DETAILED DESCRIPTION OF THE PREFERRED EMBODIMENTS

Embodiments of the structure of a loudspeaker and a loudspeaker assembly method according to the present invention will be described with reference to FIGS. 1 to 7.

Figure 1A:
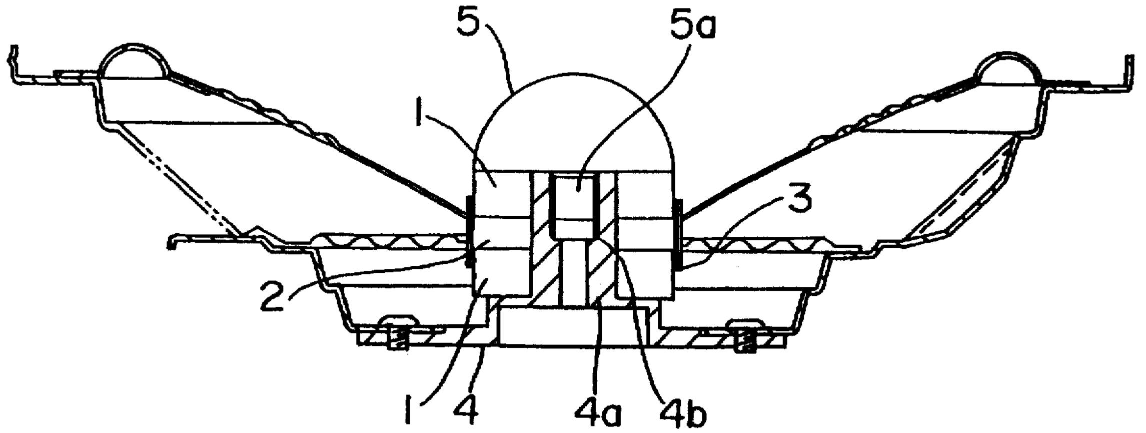
FIGS. 1A and 1B are cross sectional views showing the structure of a loudspeaker with a diffuser being mounted, according to an embodiment of the present invention.
Figure 1B:
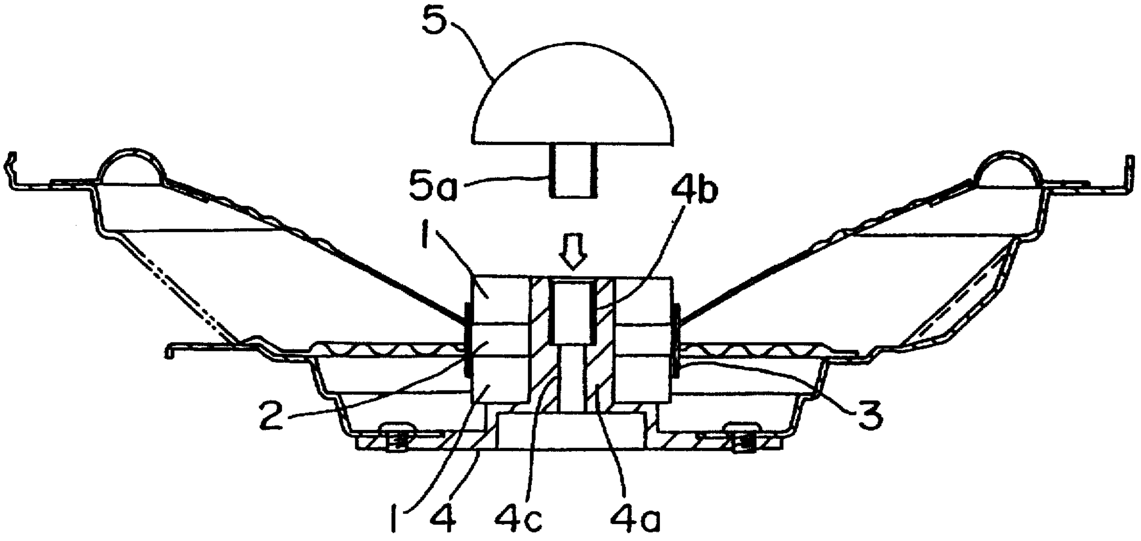

FIG. 1 is a cress sectional view showing the structure of a loudspeaker using a repulsion magnetic circuit. The repulsion magnetic circuit is formed by two magnets 1 and 1 with the same polarity being faced with each other and a plate 2 made of magnetic material such as iron and interposed between the two magnets. A voice coil 3 is disposed in a magnetic field at the outer circumferential area of the plate.

Figure 2:
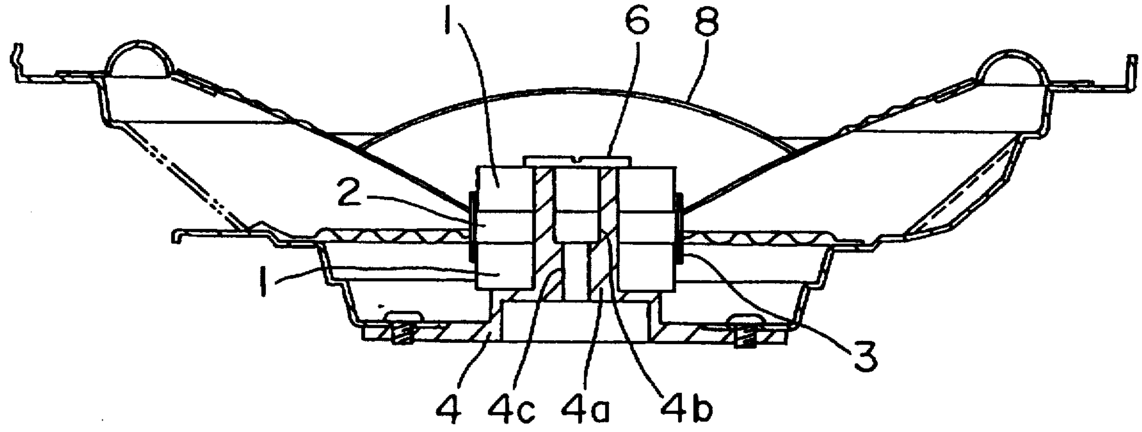
FIG. 2 is a cross sectional view showing the structure of a loudspeaker using a screw as a fastening member.

The magnets 1 and plate 2 are fitted around a support shaft 4*a* integrally formed with a holder 4. A diffuser 5 formed with an external thread 5*a* is mounted on the magnets 1 and 1 and plate 2 for fixing them. The diffuser 5 can be dismounted and has a shape such as a semisphere and a bomb to be determined by a sound quality, frequency characteristics, and the like, and is made of material such as metal, resin, and wood. As shown in FIG. 2, if a chamber 8 is to be mounted, the magnetic circuit components are fixed by a screw 6 having a wide flange.

Figure 3:
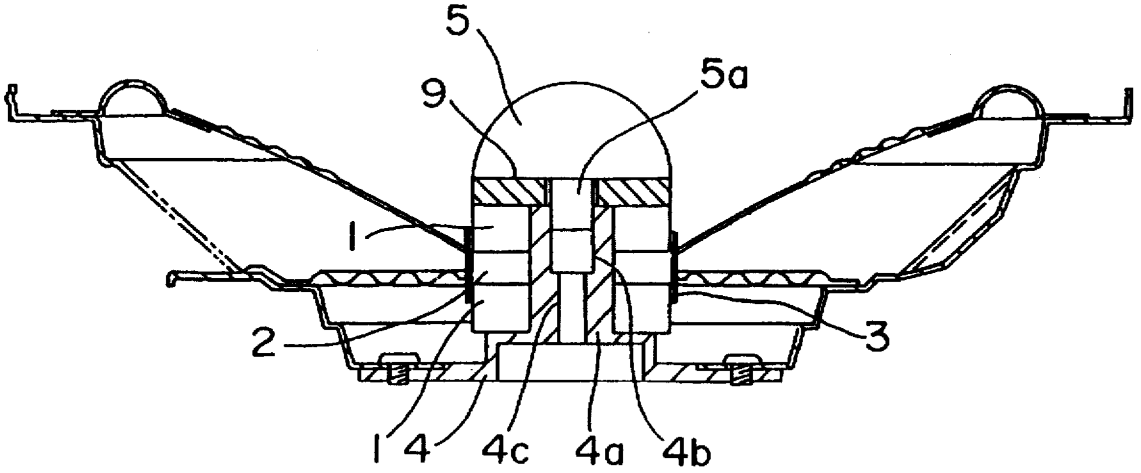
FIG. 3 is a cross sectional view showing the structure of a loudspeaker wherein a heat dissipating spacer is interposed between a repulsion magnetic circuit and a diffuser.
Figure 7A:
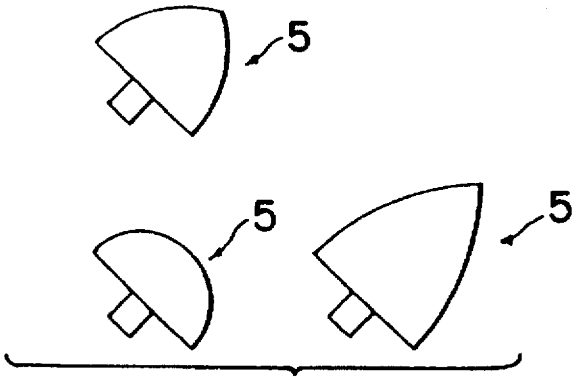
FIG.7A shows the shapes of normal type diffusers.
Figure 7B:
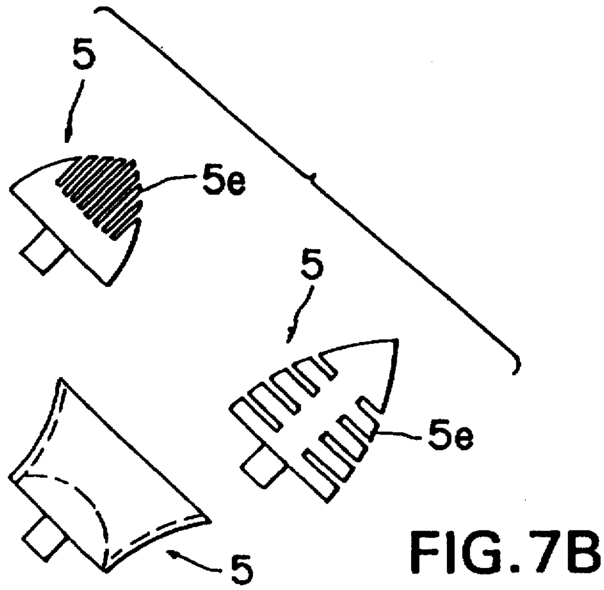
FIG. 7B shows the shapes of diffusers with a heat dissipating function.
Figure 7C:
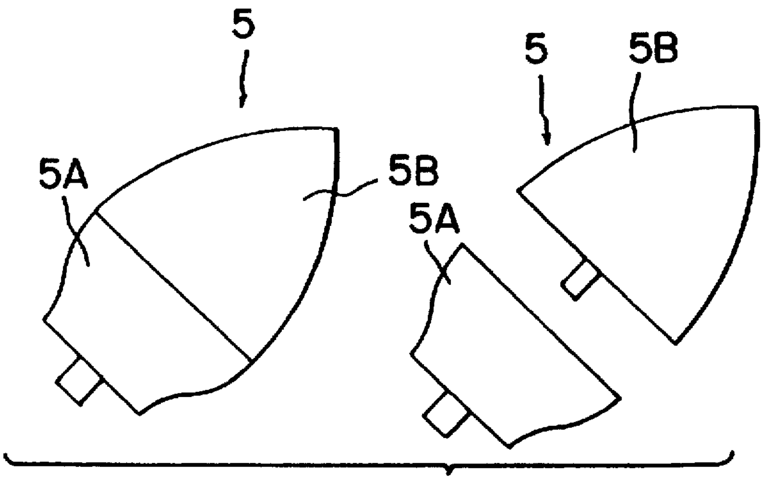
FIG. 7C shows the shapes of separate type diffusers.

To improve a heat dissipation effect, the diffuser 5 may be made of metal such as aluminum and copper or resin, or as shown in FIG. 3 a spacer 9 made of material having a good heat dissipation effect is sandwiched between the magnetic circuit and the diffuser 5. It is also effective that a heat dissipation area is made large by providing the diffuser 5 with fins 5*e* such as shown in FIG. 7B. The diffuser 5 may be divided into a base 5A and a head 5B as shown in FIG. 7C.

Figure 4A:
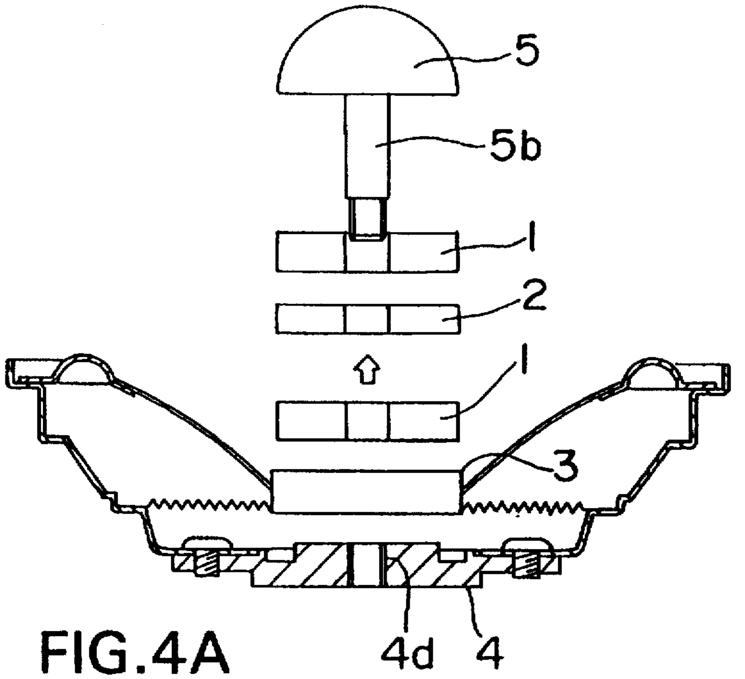
FIG. 4A is a cross sectional view showing the structure of a loudspeaker wherein a support shaft is formed integrally with a diffuser.
Figure 8A:
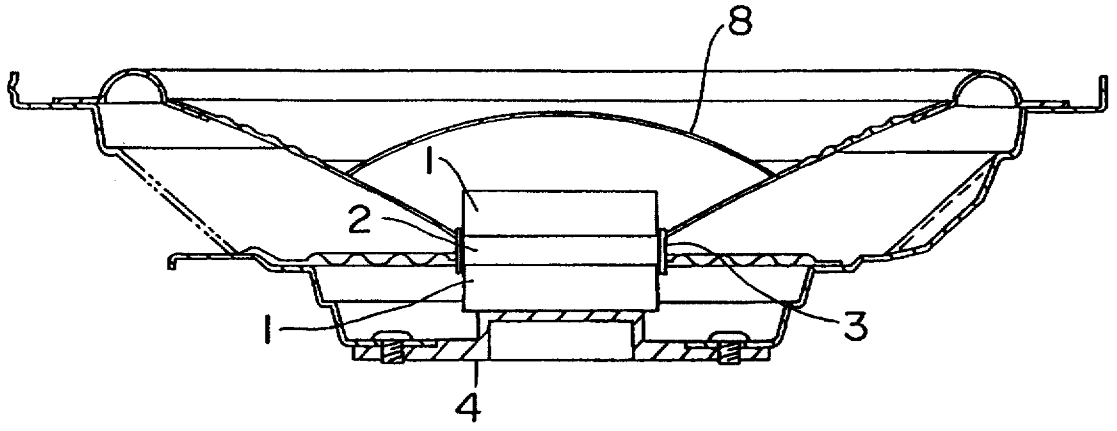
FIG.8A PRIOR ART
FIG. 8A is a cross sectional view showing the structure of a conventional loudspeaker wherein magnets and a plate are bonded and fixed without using a support shaft.
Figure 8B:
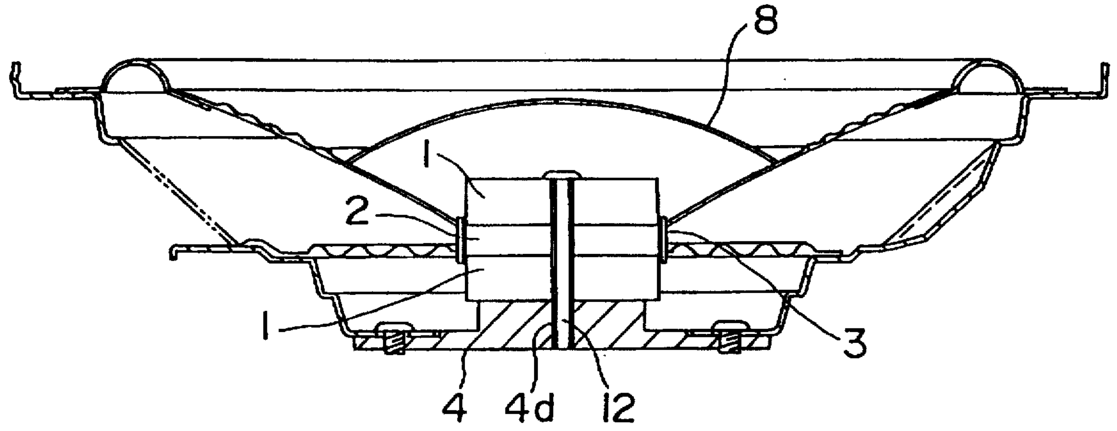
FIG.8B PRIOR ART
FIG. 8B is a cross sectional view showing the structure of a conventional loudspeaker wherein small holes are formed in magnetic circuit components to fasten them by a screw.
Figure 8C:
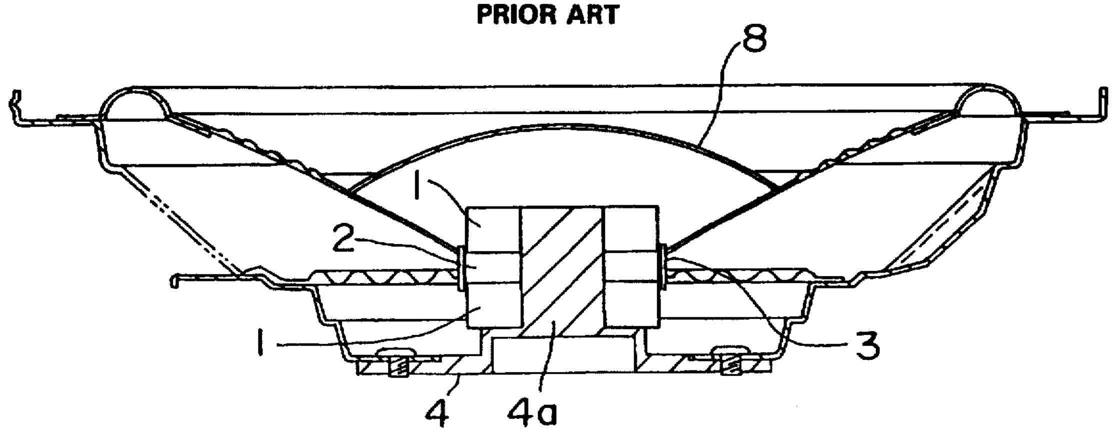
FIG. 8C is a cross sectional view showing the structure of a conventional repulsion magnetic circuit type loudspeaker proposed by the present inventors.

If the inner diameters of the magnetic circuit components are so small that an internal thread 4*b* or a guide hole 4*c* cannot be formed in the support shaft 4*a*, the magnetic circuit components may be fastened by introducing the following structure. As shown in FIG. 4A, a support shaft 5*b* is formed depending from the bottom of a diffuser 5, and inserted into the magnetic circuit components to engage it with an inner thread 4*d* formed in a holder 4. In this case, different from a conventional structure shown in FIG. 8B, since no thread is formed in the support shaft 5*b* at the positions corresponding to the magnets 1 and plate 2, the support shaft 5*b* can be inserted into the center holes of the magnets 1 and plate 2 in tight contact therewith. Accordingly, the position alignment of the magnets 1 and plate 2 can be performed precisely.

Figure 4B:
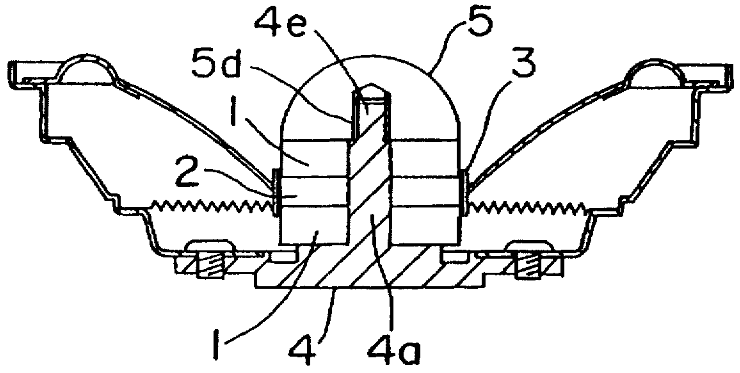
FIG. 4B is a cross sectional view showing the structure of a loudspeaker wherein an external thread is formed at the head portion of a support shaft and an internal thread is formed on the diffuser side.
Figure 4C:
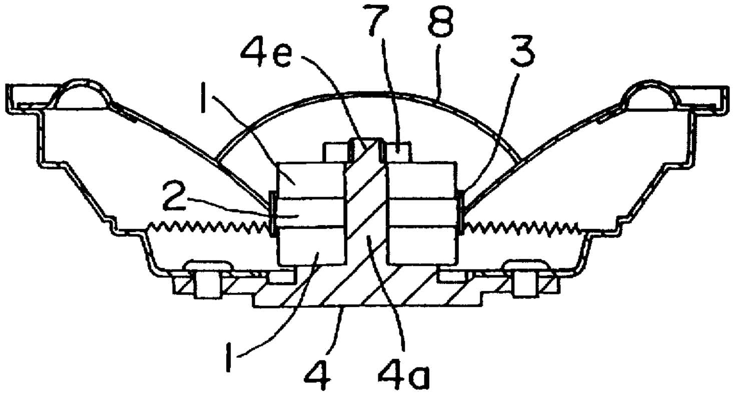
FIG. 4C is a cross sectional view showing the structure of a loudspeaker wherein a nut is used as a fastening member.

In other modifications shown in FIGS. 4B and 4C which provide the same adjustment and effects as above, an external thread 4*e* is formed in the head portion of the support shaft 4*a* of the holder 4, and a diffuser 5 formed with an internal thread 5*d* is mounted on the holder 4. If a chamber 8 is to be mounted, the magnetic circuit components are fixed by a nut 7.

Figure 5:
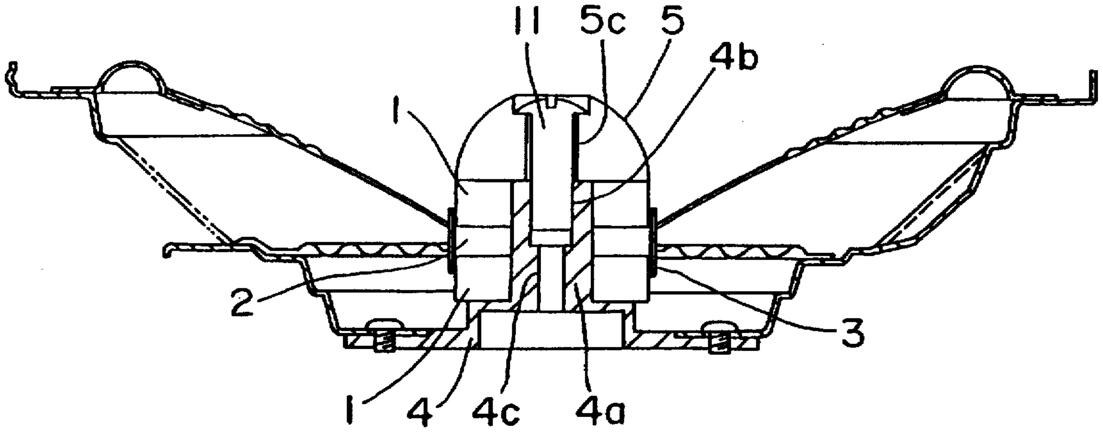
FIG. 5 is a cross sectional view showing the structure of a loudspeaker with a different mount configuration of a diffuser.
Figure 6:
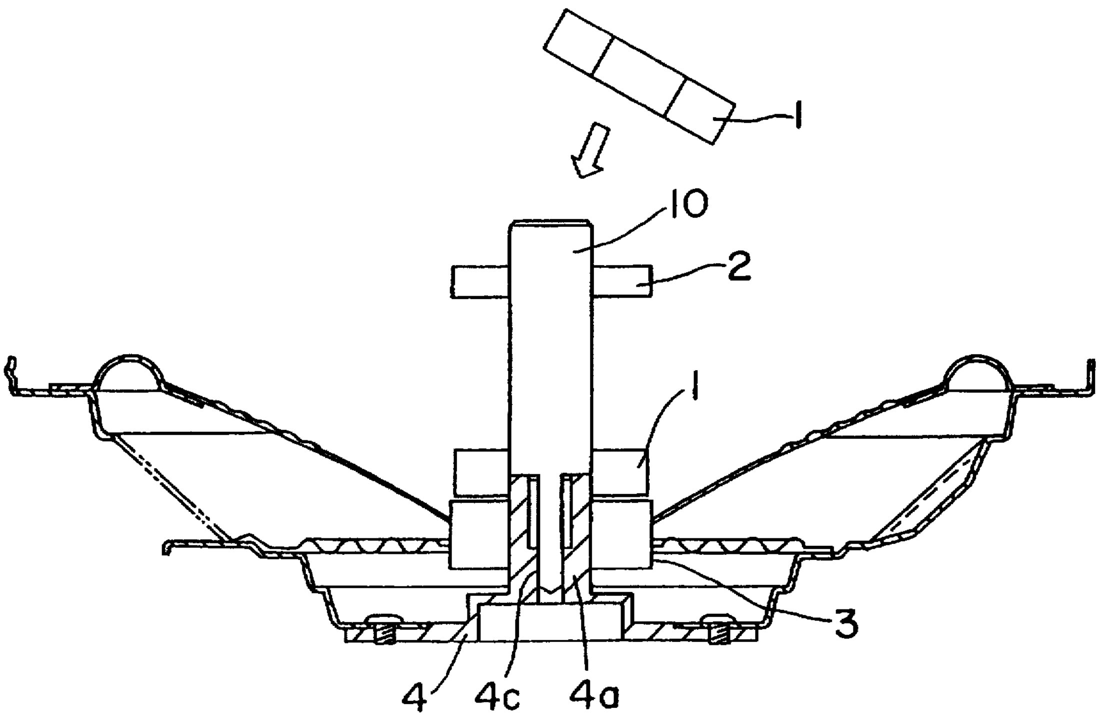
FIG. 6 is a schematic diagram illustrating a method of assembling a loudspeaker according to an embodiment of the invention, wherein a magnetic circuit insertion jig is used.

Alternatively, as shown in FIG. 5, a through hole 5*c* is formed in a diffuser 5, and a fixing screw 11 is threaded into an internal thread 4*b* of the support shaft 4*a* to squeeze and fix the magnetic circuit components between the diffuser 5 and the holder 4.

A mount for the fastening member formed on the support shaft 4*a* may be any other lock or fastening mechanism. For example, in place of the thread, one of a pair of projection and recess may be used to provide the lock or fastening mechanism.

In assembling a loudspeaker having any one of the structures of the embodiments described above, as shown in FIG. 6, a magnetic circuit insertion jig 10 is inserted into the inner thread 4*b* hole and guide hole 4*c* of the support shaft 4*a*. This jig 10 functions as a long support shaft into which a magnet 1, a plate 2, and then another magnet 1 are inserted. Since the long support shaft is used, the insertion work is easy. Assembly becomes easy by inserting the magnetic circuit components one after another separately, without being influenced by an attraction force of the magnets. There is no fear that the magnet jumps out and attaches to the plate when the latter is inserted, or that fingers are squeezed between them.

According to the loudspeaker structure of this invention, position alignment of magnets and a plate constituting a repulsion magnetic circuit can be reliably ensured and the magnetic circuit components are securely fastened and fixed without using adhesive agent.

Accordingly, there is no fear that magnets or the like are jumped out by a repulsion magnetic force.

Even if a diffuser is used as a fastening member, mounting and dismounting the diffuser is easy while securely holding the magnetic circuit components. The characteristics and sound quality of a loudspeaker can be adjusted and the heat dissipation effect can be provided by using diffusers and spacers of various types and materials.

According to the loudspeaker assembly method of this invention, it is possible to ensure position alignment of the magnetic circuit components by using the support shaft of the holder. It is also possible to firmly and reliably fasten the magnetic circuit components without using adhesive agent by coupling a fastening member such as a screw and a diffuser to a mount formed on the support shaft. By using the magnetic circuit insertion jig, the assembly of the magnetic circuit components becomes safe and smooth.

The assembly method using the magnetic circuit insertion jig is applicable also to assembly a loudspeaker having a modified structure such as a support shaft provided on the diffuser side.

What is claimed is:

1. A structure of a loudspeaker including a repulsion magnetic circuit formed by two disc-like magnets with the same polarity being faced with each other and by a disc-like plate made of magnetic material and interposed between the two magnets, and a voice coil disposed in a magnetic field at the outer circumferential area of the plate, the two magnets and the plate being respectively provided with apertures in their centers, the structure comprising:

a holder for holding magnetic circuit components, said magnets and said plates are disposed in a stack on said holder with a shaft which passes through the apertures of said magnets and said plate;

a diffuser made of non-magnetic and high thermal conductive material and formed in a bulk, the bottom end surface of which has the substantially same area as that of and is closely contacted with the top end surface of the upper-positioned magnet to effectively dissipate the heat in said magnets, wherein said magnets and said plate are fastened and fixed by coupling said diffuser to said shaft or said holder with screw means.

2. A structure of a loudspeaker according to claim 1, wherein said diffuser is provided with heat radiation fins.

3. A structure of a loudspeaker according to claim 1, wherein said diffuser is made of aluminum.

4. A structure of loudspeaker according to claim 1, wherein said diffuser has a structure dividable into two or more parts.

5. A structure of loudspeaker according to claim 1, further comprising a spacer having a high thermal conductivity and sandwiched between the bottom end surface of said diffuser and the end surface of said upper-positioned magnet.

* * * * *